United States Patent [19]

Montierth

[11] Patent Number: 4,752,516
[45] Date of Patent: Jun. 21, 1988

[54] APPARATUS FOR HIGH SPEED MANIFOLDING OF HONEYCOMB STRUCTURES

[75] Inventor: Max R. Montierth, Elmira, N.Y.

[73] Assignee: Corning Glass Works, Corning, N.Y.

[21] Appl. No.: 533,604

[22] Filed: Sep. 19, 1983

Related U.S. Application Data

[62] Division of Ser. No. 283,734, Jul. 15, 1981, Pat. No. 4,411,856.

[51] Int. Cl.$^4$ .............................................. B32B 3/12
[52] U.S. Cl. .................................... 428/117; 428/137; 428/188
[58] Field of Search ................. 264/267; 428/116, 117, 428/137, 188

[56] References Cited

U.S. PATENT DOCUMENTS

| Re. 31,405 | 10/1983 | Paisley | 428/116 X |
|---|---|---|---|
| 3,680,207 | 8/1972 | Belmonte et al. | 264/87 X |
| 3,824,196 | 7/1974 | Benbow et al. | 428/116 X |
| 3,919,384 | 11/1975 | Cantaloupe et al. | 428/116 X |
| 3,926,702 | 12/1975 | Oki et al. | 428/118 X |
| 3,954,672 | 5/1976 | Somers et al. | 428/116 X |
| 4,008,033 | 2/1977 | Folmer et al. | 428/116 X |
| 4,041,591 | 8/1977 | Noll et al. | 428/117 X |
| 4,041,592 | 8/1977 | Kelm | 428/117 X |
| 4,200,604 | 4/1980 | Dziedzic et al. | 264/60 X |
| 4,276,071 | 6/1981 | Outland | 428/116 X |
| 4,283,210 | 8/1981 | Mochida et al. | 428/116 X |
| 4,293,357 | 10/1981 | Higuchi et al. | 428/116 X |
| 4,297,140 | 10/1981 | Paisley | 428/317.7 X |
| 4,304,585 | 12/1981 | Oda et al. | 264/60 X |
| 4,329,162 | 5/1982 | Pitcher, Jr. | 418/117 X |
| 4,403,008 | 9/1983 | Factor | 428/117 |
| 4,411,856 | 10/1983 | Montierth | 428/116 X |
| 4,427,728 | 1/1984 | Belmonte et al. | 428/117 |
| 4,557,773 | 12/1985 | Bonzo | 428/116 X |
| 4,563,414 | 1/1986 | Ogawa et al. | 428/117 X |
| 4,576,774 | 3/1986 | Hazard et al. | 428/117 X |

Primary Examiner—Henry F. Epstein
Attorney, Agent, or Firm—Richard N. Wardell

[57] ABSTRACT

The invention is a flexible mask for use in charging a flowable material into selected cells of a honeycomb structure and is of particular utility in charging a sealing material into the ends of selected cells of such a structure during fabrication of solid particulate filter bodies and other selectively plugged honeycomb structures. The mask has a central body with a set of openings extending therethrough which allow passage of the flowable material through to the selected cells and a second set of protrusions extending from one of the surfaces of the mask which are used to align the mask to the end face of the structure and which extend into and sealably cover the cells which are not to receive the flowable material. The mask may be formed from a polymer, preferably an elastomer, using any of three disclosed die apparatuses. The mask may be used by fitting it to an end face of the structure and charging the flowable material through its openings or by fitting the mask across the orifice of an appropriate charging device, such as a ceramic cement press, and bringing the structure to the mask for fitting and charging.

19 Claims, 6 Drawing Sheets

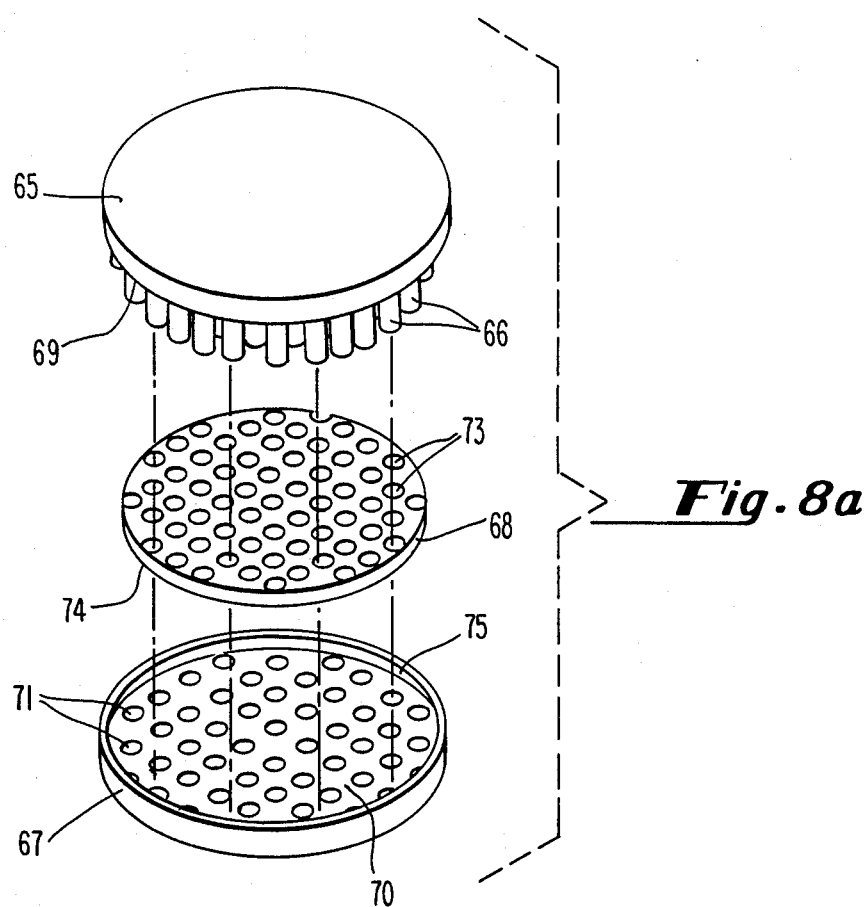
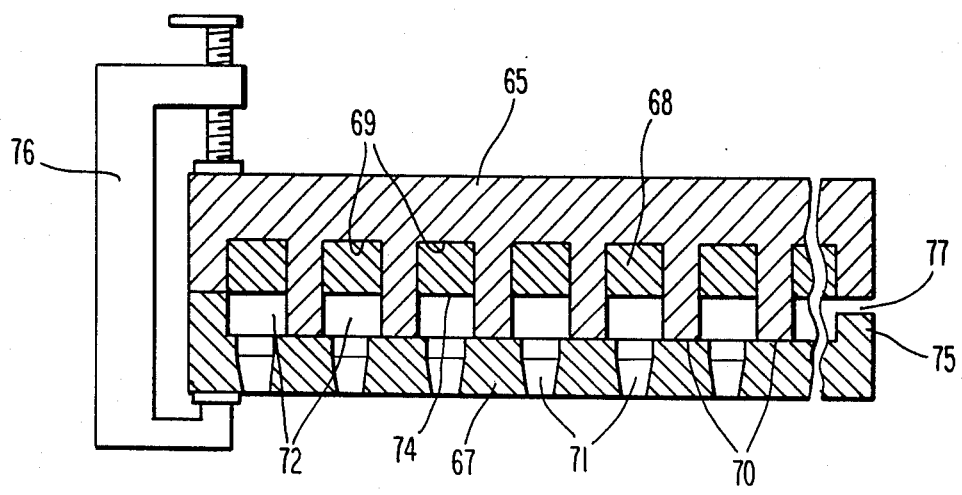

APPARATUS FOR HIGH SPEED MANIFOLDING OF HONEYCOMB STRUCTURES

This is a division of application Ser. No. 283,734, filed July 15, 1981, now U.S. Pat. No. 4,411,856.

BACKGROUND OF THE INVENTION

This invention relates to charging flowable materials into selected cells of a honeycomb structure and, more particularly, to a method and apparatus for selectively manifolding (i.e., plugging) cells of a honeycomb structure for the fabrication of filter bodies and other selectively sealed honeycomb structures.

Honeycomb structures having transverse cross-sectional cellular densities of approximately one-tenth to one hundred cells or more per square centimeter, especially when formed from ceramic materials, have several uses, including solid particulate filter bodies and stationary heat exchangers, which require selected cells of the structure to be sealed by manifolding or other means at one or both of their ends. The term "sealed" and its other corresponding grammatical forms (i.e. sealant, sealing, etc.) are used herein to refer to both porous and non porous means of closing the open transverse cross-sectional areas of cells.

It is well known that a solid particulate filter body may be fabricated utilizing a honeycomb structure formed by a matrix of intersecting, thin, porous walls which extend across and between two of its opposing end faces and form a large number of adjoining hollow passages or cells which also extend between are are open at the end faces of the structure. To form a filter, one end of each of the cells is sealed, a first subset of cells being sealed at one end face and the remaining cells being sealed at the remaining opposing end face of the structure. Either of the end faces may be used as the inlet face of the resulting filter. The contaminated fluid is brought under pressure to an inlet face and enters the body via those cells which have an open end at the inlet face (i.e., "inlet" cells). Because these cells are sealed at the opposite end face ("outlet" face) of the body, the contaminated fluid is forced through the thin, porous walls into adjoining cells which are sealed at the inlet face and open at the outlet face (i.e., "outlet" cells). The solid particulate contaminant in the fluid which is too large to pass through the porous openings in the walls is left behind and a cleansed fluid exits the filter body through the outlet cells for use.

Rodney Frost and Irwin Lachman describe in a copending application Ser. No. 165,646, filed July 3, 1980 and now abandoned, entitled FILTER AND RELATED APPARATUS and assigned to the assignee of this application, a most efficient solid particulate filter body formed from a honeycomb structure in which the cells are provided in transverse, cross-sectional densities between approximately one and one hundred cells per square centimeter with transverse, cross-sectional geometries having no internal angles less than thirty degrees, such as squares, rectangles, equilateral and certain other triangles, circles, ellipses, etc. The cells are also arranged in mutually parallel rows and/or columns. Alternate cells at one end face are filled in a checkered or checkerboard pattern and the remaining alternate cells are sealed at the remaining end face of the structure in a reversed pattern. Thus formed, either end face of the filter body may be used as its inlet or outlet face and each inlet cell shares common thin, porous walls with only adjoining outlet cells, and vice versa. Other cellular cross-sectional geometries and other patterns of sealed cells may be employed to fabricate effective, although perhaps less efficient filter bodies than those of Frost and Lachman.

For the mass production of such filters, it is highly desirable to be able to seal selected cell ends as rapidly and as inexpensively as possible. Frost and Lachman in the previously referred to application Ser. No. 165,646 and now abandoned describe fabricating filter bodies by manifolding (i.e., plugging) the end of each cell individually with a hand-held, single nozzle, air actuated gun. The hand plugging of individual cells by this process is long and tedious and is not suited for the commercial production of such filters and other honeycomb structures which may have thousands of cells to be selectively sealed. Frost and Lachman also postulate the use of an array of nozzles so that the sealing material may be simultaneously injected into a plurality or all of the alternate cells at each end face of the honeycomb structure. However, a working model of this device is not known to exist for plugging honeycomb structures having these higher cell densities.

In a copending application Ser. No. 283,733, filed July 15, 1981, entitled IMPROVED METHOD AND APPARATUS FOR SELECTIVELY CHARGING HONEYCOMB STRUCTURES and assigned to the assignee of this application, Rodney Frost and Robert Paisley first describe the use of a mask having a number of openings extending through it for selectively manifolding honeycomb structures in the fabrication of solid particulate filter bodies. Their embodiment was a rigid plate having a number of bores.

Masks have also been formed for manifolding cells which are regularly interspersed among substantially mutually parallel rows and substantially mutually parallel columns at an open surface of a honeycomb structure by applying strips of an adhesive backed flexible webbing impermeable to the sealing material, such as masking tape, over selected rows and columns of cells or, alternatively, by providing a matrix of spaced, overlayed strips of a resilient, impermeable and reusable material such as metal foil which are joined together and fitted, with or without an underlying gasket, over the open surface of the structure with the openings through the matrix and gasket, if provided, positioned opposite the cells to be charged. By providing a honeycomb structure with cells arranged in mutually parallel rows and mutually parallel columns and covering alternate rows and alternate columns of cells with strips of a suitable flexible material such as the masking tape or the joined thin metal strips, the open ends of one-half of a subset of cells arranged in a checkered pattern across the end face were exposed. After filling the ends of these cells, the strips were removed and strips applied covering the remaining alternate rows and remaining alternate columns thereby exposing the open ends of the remaining half of the subset of cells of the checkered pattern at the end face for filling. Both embodiments provide greater flexibility in dealing with surface height variations and better masking of the cell ends not to be charged including those which may be damaged than does the rigid plate embodiment. However, both embodiments must be applied twice to each end face to manifold all alternate cells at the end face in the desired checkered pattern of Frost and Lachman. This is a significant limitation with respect to the tape strips which must be individually applied across each end face, a time consuming task. The reusable matrix and gasket of the second embodiment may be more quickly applied and removed, but like the rigid plate embodiments, is less easily adapted to distortions in the cell locations at the end faces.

In another embodiment, a rigid plate was provided with a plurality of bores extending therethrough to register with the open ends of alternate cells of a honeycomb structure. Each bore was fitted with a short filling tube which protruded from the face of the plate and into a cell when the plate is aligned over the open cell ends of a honeycomb structure. A sealing material was forced from the opposing face of the plate through the bores into the cell ends receiving the tubes. To some extent, the filling tubes of the first embodiment assisted in aligning the metal plate with the cells to be filled and reduce the likelihood of sealing material being fed into the remaining cell ends covered by the plate. This embodiment was essentially inflexible, a limitation which became more significant when cell densities in the honeycomb structure were increased and distortions in the locations of cell walls become relatively more severe. Its rigid construction also sometimes damaged brittle honeycomb structures.

In another embodiment, rigid rivets were attached at regular intervals along lengths of thin flexible strips and run along alternate diagonals of cells arranged in mutually parallel rows and mutually parallel columns, each rivet being inserted into and covering the open end of a cell along the diagonal. In this way, half of the cells exposed at an end face of the honeycomb structure were covered in a checkered or a checkerboard pattern and the open ends of all of the remaining cells filled in a single sequence of steps. The strip-backed rivets were more flexible but required more handling than either of the plate embodiments, lessening their appeal for use in selectively charging honeycomb structures on a commercial basis.

In copending application Ser. No. 283,732, filed July 15, 1981 now U.S. Pat. No. 4,557,773 and entitled IMPROVED METHOD AND RELATED APPARATUS FOR SELECTIVELY MANIFOLDING HONEYCOMB STRUCTURES, Roy Bonzo describes manifolding the cells of a honeycomb structure by blocking off the open end faces of the structure with a solid covering applied thereto, preferably a preformed, transparent polymer film, and preferably an adhesive backed polyester film, and forming openings through the covering opposite selected cells at each end face with a suitable tool. In the case of the polyester film, one or more heated probes which melt openings through the film can form the openings. Again due to cellular distortions, the number of probe elements which can be used simultaneously on an opening-forming tool and thus, the number of openings which can be formed by each application of the tool is limited. These indicated shortcomings of the existing art as well as other problems are overcome to various degrees by the subject invention.

SUMMARY OF THE INVENTION

It is an object of the invention to provide an improved apparatus for more quickly sealing the cell ends of honeycomb structures in desired patterns so as to form solid particulate filter bodies and other selectively manifolded honeycomb structures.

Other objects of the invention are that the apparatus be inexpensive to fabricate, easy to use, and reusable.

It is still another object of the invention to provide an apparatus which enables more uniform filling depths than were formerly achieved when charging plastically formable materials into selected cells of a honeycomb structure using other mask embodiments.

It is yet another object of the invention to provide a selective manifolding apparatus which will not damage the cells of brittle honeycomb structures, such as those formed from sintered materials, with which it is used.

It is yet another object of the invention to provide an improved apparatus for fabricating solid particulate filter bodies and other selectively sealed honeycomb structures using green (i.e. dried but not sintered) ceramic-based structures.

It is yet another object of the invention to provide an apparatus for selectively sealing honeycomb structures which is adaptable to automated production.

These and other objects are satisfied by one aspect of the invention, a mask, which is fitted over an open surface of a honeycomb structure and exposes the open ends of selected cells at that surface. The mask consists of a central body having a first set of openings extending between and through a pair of its outer faces and a second set of protrusions extending outwardly from one of the outer faces. The mask and its protrusions are flexible and preferably elastic. The protrusions and openings are sized and spaced from one another so that when the outer face of the mask carrying the protrusions is applied to an open surface of a honeycomb structure the openings expose cell ends selected to be charged and the protrusions communicate with and extend into cell ends not to be charged. The relative spacing of the openings and protrusions on an unstretched, elastic mask are approximately the same as or less than the spacing between the corresponding cell ends with which each is to coincide. The protrusions are preferably tapered from an outer diameter equal to or greater than the minimum inner diameter of the cells to an outer diameter less than that minimum inner diameter as they extend away from the mask body so as to fill and temporarily seal cell ends into which they extend. In a mask embodiment for forming solid particulate filter bodies having cells sealed in a desired checkered or checkboard pattern, the openings and protrusions are arranged in alternating, mutually parallel rows across a face of the mask.

It is yet another object of the invention to provide means for forming such flexible masks.

It is yet another object to provide means for forming such elastic masks.

These and other objects are satisfied by a second aspect of the invention which are apparatus for forming the subject masks. In a first die embodiment, a die piece is provided with a mask forming surface and a number of openings extending through the mask forming surface and through the die piece which form the protrusions of the mask. A cavity is formed around the openings and extending away from the mask forming surface to mold the mask body. Typically, the die piece is constructed by attaching to an outer surface of a first plate having a number of bores extending through it, a second plate having an central cutout which forms the cavity sidewalls. A selected formable mask material, preferably an elastic polymer, is loaded into the die piece and after solidifying, the formed mask is removed from the die. Openings are formed through the mask at selected locations by suitable means such as drilling. In a second embodiment, a number of opening forming means such as pins are provided on the mask forming surface of the die piece of the first embodiment, the pins protruding upwardly through the cavity in which the mask body is formed. The mask is fabricated as with the first embodiment with the opening forming means creating openings through the mask being formed. A third embodiment, a compound die apparatus is provided having a first die piece with a number of openings extending therethrough for forming protrusions in the flexible mask, a second die piece having a number of opening forming means such as pins extending from one of its outer surfaces, the two die pieces being positioned together with the opening forming means contactably mating with an outer surface of the first plate, and a third stripper die piece having a number of openings through it which allow the stripper to be slidably moved along the opening forming means into contact with the second die piece. The length of the opening forming means is greater than the thickness of the third die piece and causes a cavity to be created between the first die piece and third stripper die piece, in which the mask body is formed. A suitable material such as an elastomer is introduced into the cavity. After solidifying, the first die piece is removed and the stripper die piece is separated from the second die piece removing the mask from the opening forming means.

Yet another aspect of the invention is a device for charging a flowable material into selected cells of a honeycomb structure. A feed head is provided having an exit orifice and a subject flexible mask is fitted across the orifice with its protrusions extending outward from the head and orifice. A honeycomb structure is fitted to the mask for charging with a flowable material passing through the feed head and mask openings.

DETAILED DESCRIPTION OF THE DRAWINGS

The various aspects of the invention are better understood with reference to the accompanying drawings, in which:

FIG. 5a is a sectioned view of the filter body of FIG. 5 along lines 5a-5a;

FIG. 8a is an exploded schematic view of a compound mask forming die apparatus;

FIG. 8b is a sectioned profile view of the compound die apparatus of FIG. 8a in an assembled form;

DETAILED DESCRIPTION OF THE INVENTION

Figure 1:
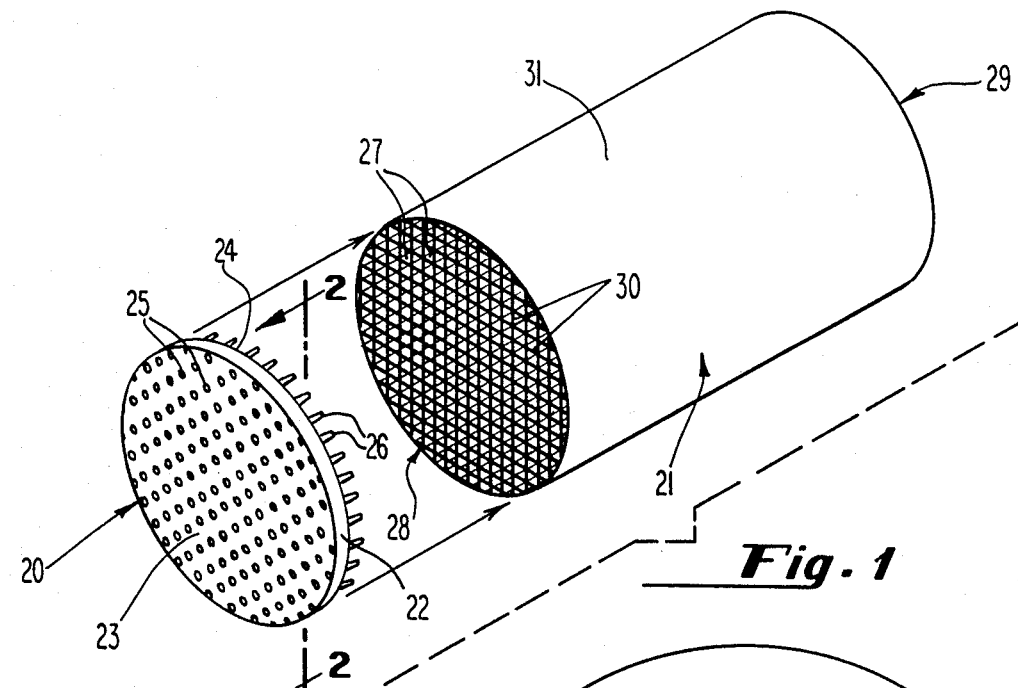
FIG. 1 is a perspective, schematic view of the subject flexible mask and a honeycomb structure with which it is used.
Figure 4:
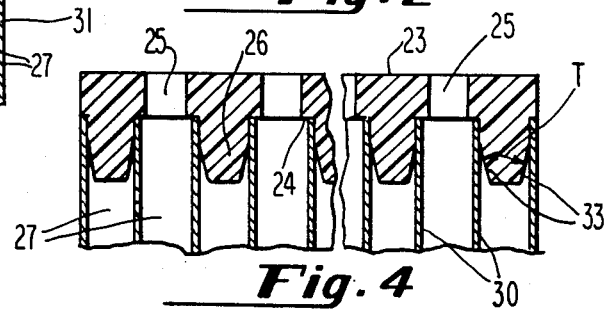
FIG. 4 is a greatly expanded and sectioned schematic view of the mask fitted to the end face of the honeycomb structure.
Figure 5:
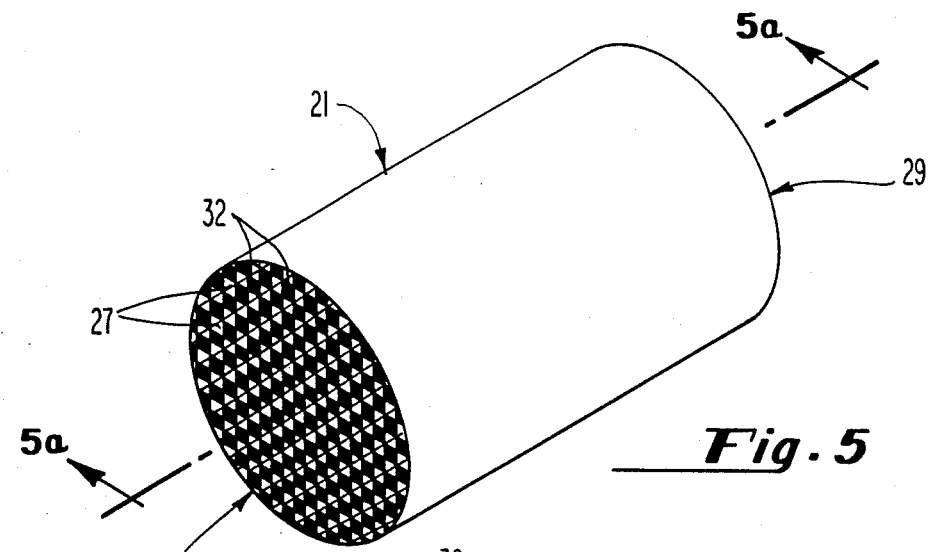
FIG. 5 is a schematic view of a solid particulate filter body formed using the mask and honeycomb structure of FIGS. 1 through 4.

FIG. 1 depicts an exemplary mask apparatus 20 and a honeycomb structure 21 with which it is used for forming a solid particulate filter body in which the cells 27 are sealed in a checkered pattern as indicated in FIG. 5. The mask 20 consists of a body 22, having a pair of opposing, typically planar, outer surfaces 23 and 24 (see FIGS. 2-4). A number of openings 25 extend through the body 22 between and through the opposing outer surfaces 23 and 24. A number of protrusions 26 extend from the downstream face 24 of the mask 20. The central longitudinal axes of the openings 25 and protrusions 26 are typically normal to those surface 24 although it is possible and in certain situations may be desirable to have the openings 25 incline in a uniform direction with respect to the surface 24. When the mask 20 is applied to an end face 28 or 29 of a honeycomb structure 21, the openings 25 allow a sealant or other flowable material to pass through the mask 20 into those cells 27 of the honeycomb structure 21 opposite each opening 25. Again, the protrusions are typically normal to the surface 24 but may be inclined, if desired or required, with respect to that outer surface 24.

The honeycomb structure 21 has a large number of adjoining hollow passages or cells 27 which extend in a substantially mutually parallel fashion through the structure between its end faces 28 and 29 (hidden). The end faces 28 and 29 typically are substantially square or perpendicular to the central longitudinal axes of the cells 27 but may be inclined thereto if desired or required. In such case the protrusions must be comparably angled so as to fittable engage the cells and allow the mask to sit flush to the end face. The cell axes desirably align substantially with those of the protrusions 26 and openings 25, making fitting of the mask 20 to the end faces 28 and/or 29 easier, and the mask directs the flowable material passed through the openings 25 directly into the cells for uniform filling across the cross-sections. The cells 27 are formed by a matrix of thin, intersecting walls 30 which extend across and between the end faces 28 and 29. For solid particulate filter bodies, the walls 30 are also porous and continuous across and between the end faces 28 and 29. The structure 21 may also be provided with an outer skin 31 between the end faces 28 and 29 surrounding the cells 27.

A honeycomb structure 21 may be provided from any of a variety of suitable materials including metal, ceramics, glasses, paper, cloth and natural or man-made organic compounds, as well as combinations thereof, by any method suitable for the materials selected. For the production of solid particulate filter bodies, porous walled honeycomb structures may be conventionally formed by extrusion from sinterable mixtures in the manner described in U.S. Pat. Nos. 3,919,384 and 4,008,033. Cordierite compositions preferred for forming substantially thermostable ceramic honeycomb structures with various degrees of open porosity are described in the aforesaid Frost and Lachman application Ser. No. 165,646 and now abandoned which is incorporated by reference herein in its entirety. It will be appreciated that a that a subject mask however, may be used with honeycomb structures 21 formed from other materials and/or by other methods.

The open, transverse cross-sectional areas of the cells 27 are square and are arranged at the end faces 28 and 29 in mutually parallel rows and mutually parallel columns which are mutually perpendicular to one another. It will be appreciated that the rows and columns may not be exactly parallel and perpendicular due to manufacturing limitations in fabricating the honeycomb structure 21. The square, cross-sectional geometry and the row and column arrangement of cells at the end faces depicted in this application are exemplary. A mask 20 may be fabricated to fit a variety of cellular arrangements and cellular cross-sectional geometries and to provide a variety of selected cell charging patterns.

The positioning of the openings 25 in an protrusions 26 on the mask 20 are made with respect to the cells 27 of the honeycomb structure 21 with which the mask is used. Each opening 25 is positioned on the mask to coincide with the open end of a cell to be charged with a filling material through the mask when the mask is properly positioned over the end face (see FIG. 4). The openings 25 are suitably sized to expose the open ends of the selected cell or cells sufficiently for charging but not so large as to expose part or all of any other cell not to be charged. Larger openings can be provided to expose several adjacent cells if desired.

Each protrusion 26 is similarly positioned on the mask to suitably engage and is preferably sized to seal a single cell at the end face 28 or 29 over which the mask 20 is fitted. The protrusions 26 are preferably elastic and taper from a diameter at their base which is equal to or larger than a diameter at their tip which is smaller than the minimum cross-sectional diameter of the open end of cell with which they engage. Cone-topped cylindrical protrusions depicted in FIGS. 1-4 are easy to form as are other shapes having a surface of rotation (i.e. cones, domes, domed cylinders, bullet shapes etc). The protrusions need not taper along their entire length although it is desirable that the protrusion tip distal to the mask body 22 be tapered to provide some tolerance during initial registration of the protrusions with the cell ends. The included angle of taper T between the protrusion side walls 33 (see FIG. 4) near the distal tip of the protrusion 26 should be less than 90 degrees and desirably between approximately 10 and 50 degrees.

The mask 20 is formed from a flexible material impermeable to and non-reactive with the sealing material or other flowable material to be charged through the mask 20. Flexibility allows the mask 20 to conform to unevenness and some distortions and deformities in the cellular arrangements at the structure's end faces 28 and 29. This characteristic is significant because in many cases, notably the ceramic arts, undistorted and undeformed honeycomb structures cannot be provided with regularity by conventional manufacturing techniques. This problem increases with increasing cell densities, increasing end face dimensions and decreasing structural stiffness during formation of the structure, and is relatively significant with respect to a mass fabrication of ceramic-based filter bodies such as the diesel particulate filter embodiment described in the aforesaid Frost and Lachman application Ser. No. 165,646 and now abandoned. Preferably the mask and its protrusions are also elastic. Such masks are most conveniently formed monolithically from any of several possible elastomers (i.e., elastic polymers) by casting or injection molding in a manner to be later described. Elastic masks have been successfully formed from various silicones and urethane although it is envisioned that other flexible materials including other elastic polymers may be used. Elasticity also allows the mask 20 and protrusions 26 to accomodate cellular spacing distortions at the end faces 28 and 29 and the tapered protrusions to sealably fit the open ends of cells 27 without damaging them when the mask 20 is applied. It is envisioned that the flexible masks will be fabricated from any of several moldable, polymerizable resins including silicones and urethanes or other materials also having a Durometer Shore A value ranging between approximately 10 and 70 (See ASTM Standard D-1706) and a Young's (E) Modulus of approximately 30,000 psi (about 2110 kg./cm.$^2$) or less, although a Young's Modulus in the range of approximately 500 to 3000 psi (about 35 to 211 kg./cm.$^2$) is preferred for elastic masks used in fabricating solid particulate filter bodies from the aforesaid ceramic-based honeycomb structures.

The mask 20 depicted is sized to cover the open end faces 28 and 29 of the structure 21. Protrusions 26 are provided on the mask 20 to fitably engage each cell which is not to be charged with a sealing material through the mask. It should be appreciated that a protrusion need not be provided for each cell which is not to be charged at the covered end face and that many of the protrusions 26 on the exemplary mask 20 of FIGS. 1 through 4 could have been eliminated without detrimental effects. Indeed, because cells at the periphery of an end face may have partial or reduced cross-sectional areas which will make fitting a full-sized protrusion difficult or impossible, it may also be desirable in some applications to reduce the surface area of the mask to less than that of the end faces allowing the cells at the periphery of the end face to be charged, or, if that is unacceptable, to eliminate the protrusions at the outer edge of the mask. Similarly, in certain applications it may also be desirable to omit openings through certain areas of the mask so as to leave two or more adjoining cells unplugged.

Care should be taken to account for any shrinkage which occurs in the fabrication of the mask. If a polymerizable resin is used, it will typically experience shrinkage at a rate which will differ as the proportions of its components and the conditions under which it is cured are varied. Exact sizing of a mask to its honeycomb structure is preferred as dimensional mismatch will make the fitting of the mask to an end face more difficult. It was observed that if mask opening/protrusion spacing were excessively undersized or oversized with respect to the corresponding cell spacing, the elastic protrusions would "knuckle under" while an elastic mask was being pressed aginst the end face making fitting impossible. Some tolerance to elastic mask undersizing has been observed in applying masks approximately 0.125 inches (3 mm.) thick and having protrusions about 0.125 inches (3 mm.) long and about 0.07 inches (about 1.8 mm.) thick, openings about 0.086 inches (about 2 mm.) in diameter and a Young's Modulus of approximately 3000 psi (about 211 kg/cm$^2$) or less to honeycomb structures having cell densities of approximately 100 cells/sq.in. (about 15.5 cells/sq.cm.). For very small areas, approximately one-half inch (1.27 cm) in diameter, about 8 to 10% undersizing of the mask could be accommodated; at diameters of about 4 inches (10.16 cm), about 4% undersizing of the mask could be accommodated; at a diameter of approximately 6 inches (15.24 cm), approximately 1% undersizing of the mask could be accomodated. No tolerance for elastic mask oversizing was observed although very minor oversizing (less than 1%) might be accomodated. It is believed that approximately 1% undersizing over a 6 inch diameter area could be accomodated for other elasic masks (having a Young's Modulus of up to approximately 10,000 psi (about 703 kg./sq. cm.)). Undersizing of the mask to the structure is depicted in FIG. 7f with reference to the centerlines 63 of adjoining protrusions 26 and the centerlines 64 of the cells 27 with which they engage.

Figure 2:
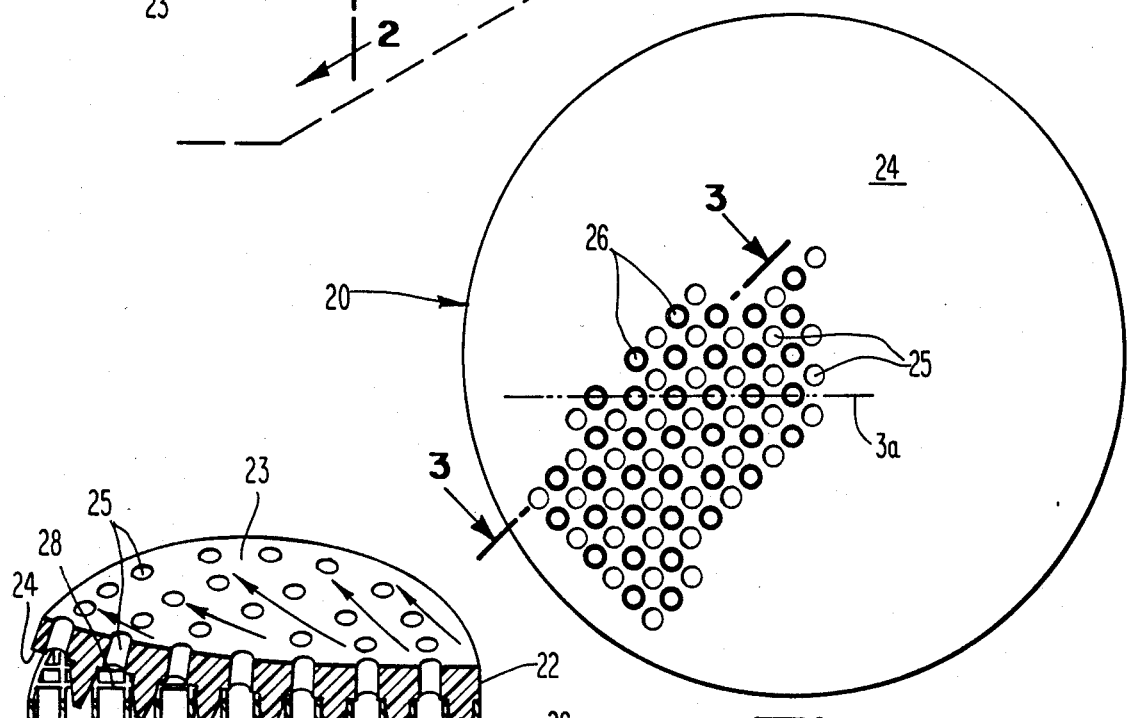
FIG. 2 is an end face schematic view of the subject flexible mask of FIG. 1 showing the relative positioning of some of its adjoining openings and protrusions.

FIG. 2 is a view of the outer surface 24 of the mask 20 shown in FIG. 1 and depicts a portion of its openings 25 and protrusions 26. The openings 25 and protrusions 26 are alternated with one another along rows and columns parallel or perpendicular to the line 3—3 so as to coincide with the rows and columns of cells 27 at the end faces 28 and 29. Each opening 25 and protrusion 26 of the mask 20 in FIG. 2 will be positioned juxtapose one cell 27 when the mask 20 is applied to either end face 28 or 29. As the mask 20 has been fabricated to fit either end face 28 or 29 and expose in a checkered pattern the square cells of the honeycomb structure 21, the openings 25 and protrusions 26 are formed in rows mutually parallel to the line 3a—3a. The line 3a—3a bisects a row of evenly spaced protrusions 26. Rows of evenly spaced openings 25 and evenly spaced protrusions 26 are alternated with one another across the mask surface 24 to either side of the row of protrusions bisected by line 3a—3a. These rows of protrusions 26 and openings 25 will align with the diagonals of the cells 27 when the mask 20 is fitted to the end face 28 or 29. If a plugging material is charged through the openings 25 in the mask 20, the open ends of the cells 27 in an adjoining end face 28 or 29 will be filled in a checkered or checkerboard pattern as is indicated in FIGS. 5 and 5a.

Figure 3:
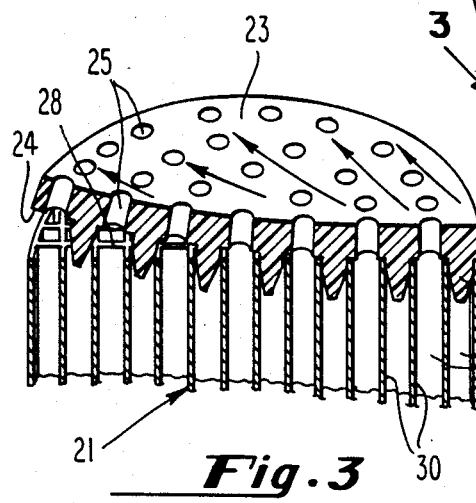
FIG. 3 is a sectioned view of the subject flexible mask being fitted to an end face of the honeycomb structure.

The mask 20 may be hand fitted to an end face 28 or 29 of a honeycomb structure in the manner depicted in FIG. 3. It is suggested that the protrusions 26 at or near one outer edge of the mask 20 be fitted into corresponding cells 27 near an edge of the end face. The mask may be moved laterally for very short distances in a variety of directions across the end face and rotated in opposing directions to start the engagement of one or more of the protrusions with appropriate cells in the end face. Other protrusions 26 are fitted into appropriate corresponding cells in directions radiating from the initially aligned protrusions as indicated by the arrows extending across the outer surface 23 of the mask 20 in FIG. 3. It is helpful to stretch an undersized mask and vibrate it slightly back and forth across the end face 28 or 29 during this process to align the protrusions 26 with the appropriate cell ends. Once it is sensed that the protrusions have aligned with underlying cells, the outer surface 23 of the mask is pressed down to insert the aligned protrusions into the cell ends. This process is continued until the mask 20 is fitted flush across the entire end face 28 or 29 of the structure 21.

A solid particulate filter body is formed by charging a flowable sealing material through the openings 25 in the mask 20 into a subset of alternate cells at one end face 28 or 29, removing the mask 20, applying it or a comparable mask to the remaining end face of the structure 21 with the openings 25 aligned over the remaining alternate cells and charging the sealing material into those cells. The structure and sealing material may be cured or fired, if appropriate. Foam-type cordierite ceramic cements, which are compatible with the aforementioned cordierite structures and chargeable with the subject mask, are described in a pending application Ser. No. 165,647 by Robert Paisley, entitled CERAMIC FOAM CEMENT, filed July 3, 1980, now U.S. Pat. No. 4,297,140 reissued as Re. No. 31,405 and a preferred composition of this cement is described in the aforesaid Frost and Lachman application Ser. No. 165,646. The application Ser. No. 165,647 is assigned to the assignee of this application and is incorporated by reference herein. It is envisioned that the subject masks may also be used to charge non-foaming ceramic cements as well as other flowable materials of various viscosities into selected cells of honeycomb structures for various applications.

Figure 5A:
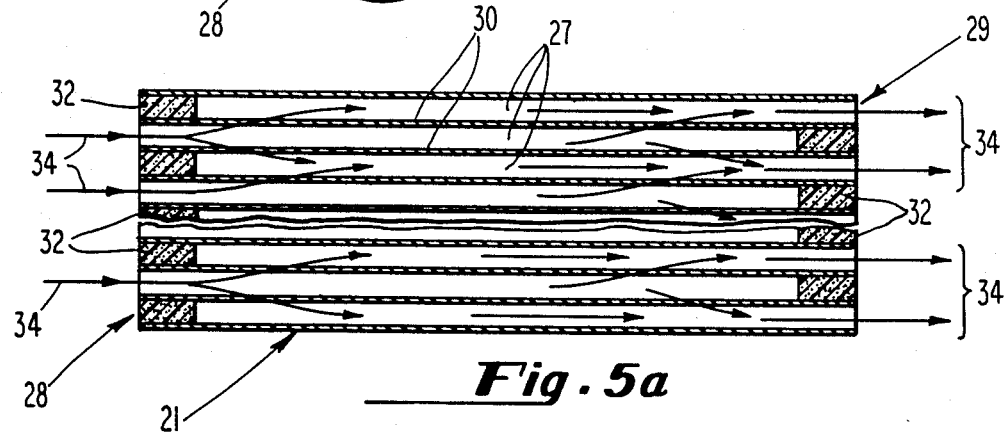

A filter body formed from the structure 21 of FIGS. 1 through 4 is depicted in FIGS. 5 and 5a with alternate cells 27 sealed in a checkered pattern on end face 28. This pattern is reversed on the end face 29 as can be seen in part in FIG. 5a, a cross-sectioned view along a row of the cells in the filter body of FIG. 5 depicting the plugs 32 formed by the sealing material charged through the mask openings 25. Flow of a contaminated fluid through the filter is indicted in FIG. 5a by arrows 34. The contaminated fluid enters through the "inlet" cells 27 open at the left ("inlet") end face 28, passes through the thin and porous walls 30, into adjoining "outlet" cells open at the right ("outlet") end face 29, and in the process leaves the contaminants too large to pass through the walls 30 in the inlet cells open at end face 28. Additionally the plugs 32 may be formed with open porosity equal to or less than that of the thin walls 30 and allow some fluid flow therethrough which will not impair the operation of the filter body. Operation of the filter is described in more detail in the aforesaid application Ser. No. 165,646.

Figure 6A:
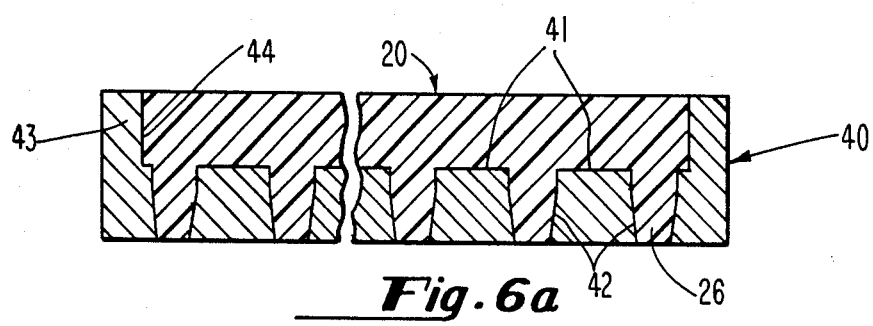
FIG. 6a is a sectioned schematic view of a simple die for casting a flexible mask having protrusions but no openings.
Figure 6B:
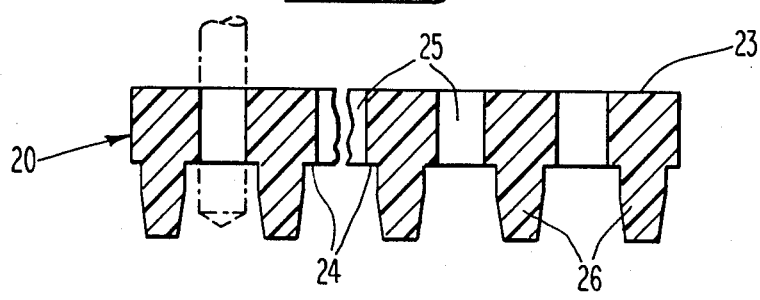
FIG. 6b is a sectioned schematic view of the mask formed on the simple die depicted in FIG. 6a having openings being formed through it.

A second aspect of the invention is die apparatus and methods for using the same to fabricate a flexible or elastic mask similar to that depicted in FIGS. 1 through 4. A first mask forming apparatus is depicted in cross-section in FIG. 6a and consists of a mold 40 having a mask forming outer surface 41, typically planar, and a multiplicity of bores 42 extending through the mask forming surface 41 and mold 40 in directions essentially normal to the mask forming surface 41. A cavity 44 in which the mask body is formed is defined by a ridge 43 which extends outwardly from the mask forming surface 41. The bores 42 form the protrusion 26 of the mask 20 and are desirably tapered inwardly as they extend away from the mask forming surface 41, preferably at an included angle between approximately 10 and 50 degrees. After being cast in a manner to be subsequently described, the mask is removed from the mold 40 and openings 25 made through the body of the mask 20 at selected locations among the protrusions 26 as indicated in FIG. 6b. The openings 25 may be made by any suitable means such as but not limited to boring, cutting, drilling (depicted), burning and melting. If formed from a elastic polymer, the mask may be chilled to make the operation easier to perform. In the preferred embodiment, the openings 25 are also essentially normal to the outer downstream surface 24 of the mask 20 from which the protrusions 26 extend.

Figure 7A:
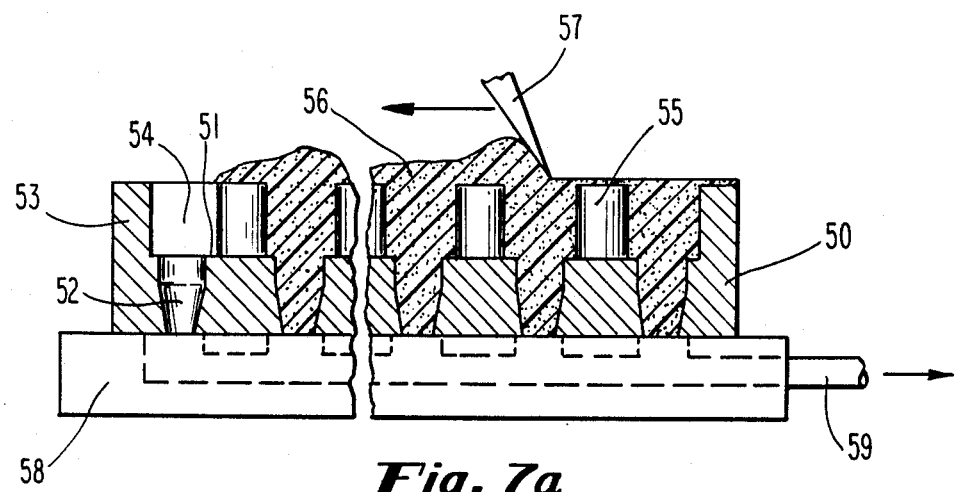
FIG. 7a is a sectioned schematic view of a second simple die for forming a flexible mask having both protrusions and openings, showing a polymer being loaded into the die.
Figure 7B:
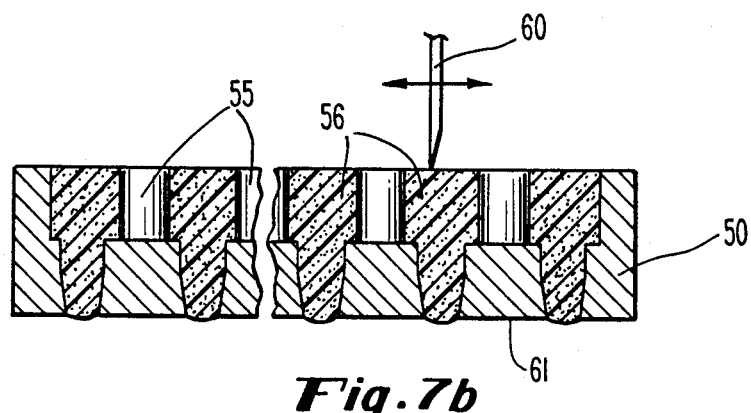
FIG. 7b depicts the upper surface of the polymer cast into the second simple die of FIG. 7a being smoothed to form an outer surface of a flexible mask.
Figure 7C:
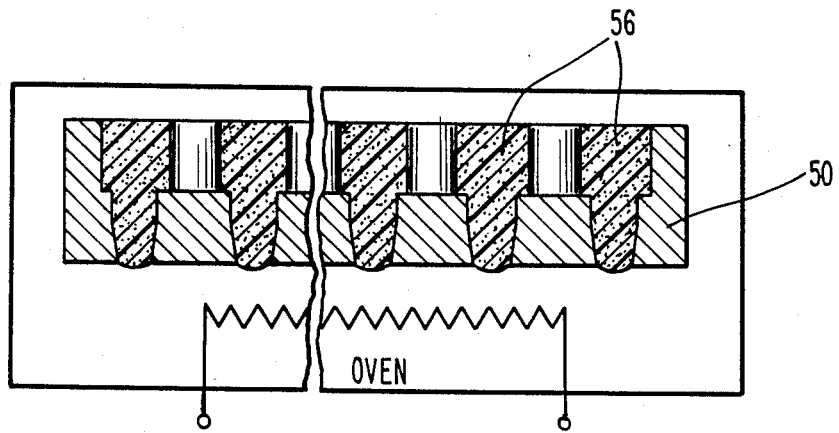
FIG. 7c depicts schematically the curing of the mask in the second simple die in an oven.
Figure 7D:
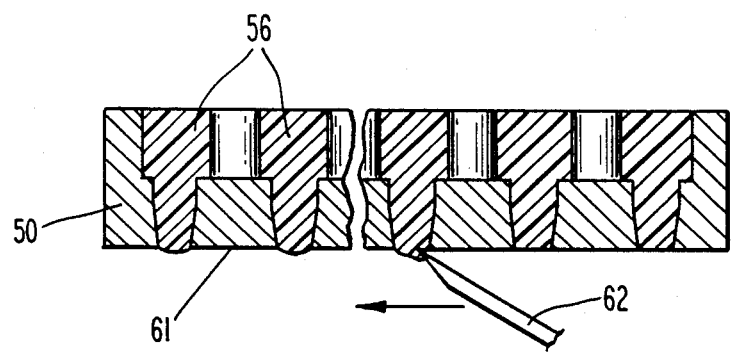
FIG. 7d depicts schematically the flashing being removed from the lower outer surface of the second simple die after the mask has been cured.

FIG. 7a depicts a cross-sectioned profile view a second mask forming apparatus. Like the first apparatus of FIG. 6a, the second apparatus of FIG. 7a consists of a mold 50 having a plurality of tapered bores 52, a mask forming surface 51, and a ridge 53 which forms with the mask forming surface 51 a cavity 54 within which the body of the mask is formed. The second apparatus further includes a plurality of means 55, such as pins, for forming an equal plurality of openings through the mask. It is preferred that the tops of the means 55 form a common plane with the top of the ridge 53 to assist in forming a flat outer surface on the mask, as will be subsequently described.

Figure 7E:
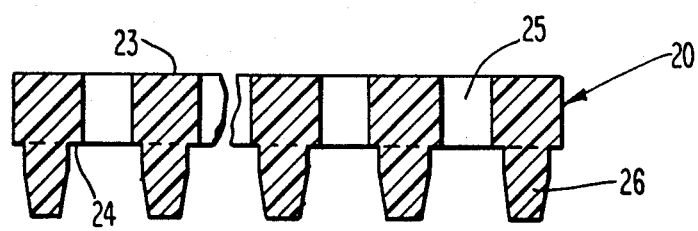
FIG. 7e depicts a sectioned, schematic, profile view of the mask produced in the second simple die by the steps depicted in FIGS. 7a through 7d.
Figure 7F:
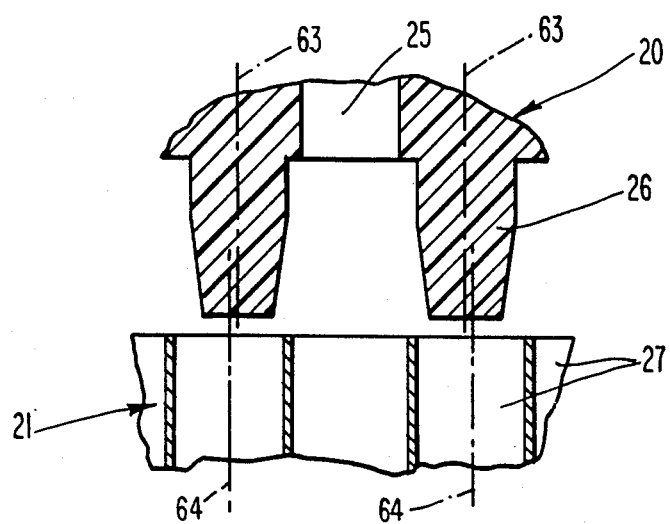
FIG. 7f depicts schematically the undersizing of the mask with respect to the cells of the honeycomb structure.

A mask 20 formed within the apparatus of FIG. 7a is depicted in cross-section in FIG. 7e and has a pair of opposing outer surfaces 23 and 24, a first plurality of openings 25 extending through and between the outer surfaces 23 and 24, and a second multiplicity of protrusions 26 extending from the outer surface 24. Again, the protrusions 26 are preferably tapered downward at an included angle of between about 10 and 50 degrees and the protrusions 26 and the openings 25 extend essentially normally from the outer surface 24.

Simple working models of die apparatus corresponding to those depicted in FIGS. 6a and 7a through 7d can be formed from transverse cross-sections of the honeycomb structures with which the masks are to be used. To form the die of FIG. 6a, the cells of a honeycomb section are filled with an easily removed solid material such as wax and affixed to a supporting plate using wax or a suitable adhesive. The wax or other solid material is removed from selected cells in which protrusions of the mask will be formed. The outer perimeter of the sectioned structure is then surrounded with a collar to form ridge 43 and a selected polymer is cast in the mold thus formed. A die apparatus similar to that depicted in FIGS. 7a through 7d may be formed by the additional insertion of pins into selected cells of the sectioned structure. A Conap, Inc. No. TU-65 urethane was mixed according to directions and cast in such an apparatus to establish the feasibility of the casting processes. After a room temperature cure for about 18 hours, the solidified mask was removed from the die and oven heated at about 200° Fahrenheit (93° Centigrade) for about 16 hours to complete curing. Preferably, however, the die apparatus is fabricated from a rigid, machinable material such as metal for precise dimensioning of the formed mask. It will further be appreciated that the die apparatus of FIGS. 6a and 7a through 7d can be constructed in two pieces consisting of a flat plate having a mask forming surface 41 or 51 with, in the latter case, openings forming means 55 protruding therefrom and bores 42 or 52 extending therefrom and therethrough and a second plate having a center cutout which is attached to the first plate 40 or 50 to provide the ridge 43 or 53 forming the cavity 44 or 54.

A mask is formed in the mold 50 in the manner depicted in FIGS. 7a through 7d. The mold 50 is cleaned with a suitable agent such as acetone or xylene prior to forming each mask. After cleaning the inner surfaces of the mask forming cavity 54 and bores 52, they are coated with a suitable releasing agent, such as a 20:1 ratio by weight solution of methylene chloride and Johnson TM Paste Wax. A suitable polymerizable resin ("polymer") is mixed and de-aired by an appropriate device such as a vacuum chamber. A mass of mixed and de-aired polymer 56 is applied to top of the mold 50 and is worked into the cavity 54 and bores 52 with a suitable tool 57 such as a spatula or putty knife. The mold 50 may be mounted on a vibrator platform 58 and/or a vacuum source 59 may be applied to the ends of the bores 52 opposite the mask forming surface 51 in order to work the polymer into the bores 52 and recesses of the cavity 54. Other devices such as ultrasound sources (not depicted) may be employed in working the polymer into the cavity 54 and bores 52. The surface of the polymer is leveled with the upper surfaces of the ridge 53 and opening forming means 55 with the tool 57. The extrusion of the polymer material through all of the openings of the bores 52 at the bottom surface 61 of the mold 50 (see FIG. 7b) indicates that the cavity 54 and bores 52 are filled. The tops of the means 55 then are scraped clean with a sharp edge 60 such as a razor as depicted in FIG. 7b, leaving a smooth outer face on the molded polymer. The polymer is then cured in a manner appropriate for the materials selected. The curing of many polymers may be accelerated by baking as is depicted in FIG. 7c. After baking, the mold 50 and cured polymer are removed from the oven and are allowed to cool. Once the mold 50 is sufficiently cooled to be handled, the polymer extruded through the bottom of the bores 52 and beyond the bottom surface 61 of the mold 50 are removed by suitable means 62 such as a razor blade or scraper as indicated in FIG. 7d. The cured polymer is then pulled from the mold and trimmed to an appropriate size, if required. Except for the cleaning of the pin tops (FIG. 7b), the same steps are followed in casting a mask in the mold 40 (FIG. 6a). Again, openings must be formed through the mask after its removal from the mold 40 (FIG. 6b).

Yet another apparatus, an envisioned compound die for forming a mask, is depicted in an exploded view in FIG. 8a and in a sectioned profile view in FIG. 8b, and consists of a first die piece 65 having means 66 to form the plurality of openings in the subject mask, a second die piece 67 for forming the flexible protrusions extending from one face of the mask and a third die piece 68 positioned between the die pieces 65 and 67 for stripping the subject mask from the die after being formed. This compound die apparatus allows faster and easier mask fabrication than either of the die apparatus depicted in FIGS. 6a and 7a through 7d. The first die piece 65 has an essentially planar bottom outer surface 69 (hidden) from which extends a plurality of means 66 such as pins or tubes for forming the openings 25 in the mask 20 (see FIGS. 1 through 4). The second die piece 67 has an upper outer surface 70 designed to contactably mate with the ends of the means 66. For ease of use it is suggested that the ends of the means 66 be flat and form a common plane and that the outer surface 70 of the second die piece 67 also be planar. The second die piece 67 is further provided with a plurality of bores 71 extending therethrough from the outer surface 70. The walls of the bores 71, which form the protrusions 26 of the mask 20 (FIGS. 1 through 4), extend normally away from the outer surface 70 for a short distance and then taper inwardly, suggestedly at an included angle of between approximately 10 and 50 degrees as they extend away from the outer surface 70. The third die piece 68 is essentially planar and is positioned within a cavity 72 formed between the first and second die pieces 65 and 67, respectively, when the opening forming means 66 are positioned against the second piece outer surface 70 (see FIG. 8b). The third die piece 68 is provided with a second plurality of bores 73 equal to the number of means 66 and which are positioned and sized so as to allow the third die piece 68 to be slid along the means 66 and positioned against the surface 69 of the first die piece 65 with the means 68 extending completely through and protruding from lower surface 74 of the third die piece 68. The tolerances between the plurality of bores 73 and means 66 should also be sufficiently tight to prevent the intrusion of polymer and the formation of flash during the fabrication of the mask. However, if flash is formed it may be removed by suitable means such as water jetting or burnishing. The mask is formed between the lower surface 74 of the third die piece 68 and upper surface 70 of the second die piece 67.

A mask may be cast in the third die apparatus in a manner similar to that used with the first two die embodiments. The die pieces 65, 67 and 68 are cleaned and a removal agent applied to the mask forming surfaces. A suitable polymer is mixed, de-aired and applied to the upper face 70 of the second die piece 67 and is worked into the bores 71. The second piece 67 may be formed with a ridge 75 to contain the polymer during this process. The mated first and third die pieces 65 and 68 are pressed against the second die upper surface 70 and held in place by suitable means 76 such as clamps (depicted) or screws or nuts and bolts during the curing of the polymer. If the peripheral ridge 75 is provided, it should be low enough so that one or more narrow gaps 77 are formed around the cavity 72 through which excess polymer material may be squeezed (see FIG. 8b). The third die piece 68 is held against the first die piece 65 by the polymer between the piece 68 and the second die piece 67. After curing, polymer extruded through the tapered bores 71 is again removed by a suitable tool such as a razor knife (see FIG. 7d). The means 76 used to hold the three die pieces together are removed and the second die piece 67 removed from the first and third die pieces 65 and 68. Frictional forces will hold the mask 20 to the opening forming means 66 extending through the mask forming lower surface 74 of the third die piece 68. This mask forming lower surface 74 eliminates the separate upper mask surface forming step required in the first two die embodiments (see particularly FIGS. 7a and 7b). The mask 20 thus formed within the cavity 72 and tapered bores 71 may be stripped from the opening forming means 66 by sliding the third die piece 68 along the means 66 away from the first die piece 65. If desired or necessary, the formed mask may be trimmed to a suitable shape for use.

Comparable die pieces may also be used for injection molding of the mask. In an injection molding apparatus, means are provided for injecting the polymer or other flowable material into the cavity, such as through the gap(s) 77.

Sintered honeycomb structures with which the described mask have been used, typically experience shrinkage during their drying and sintering cycles which vary with compositional and drying/curing schedule variations. By varying polymer mixtures and/or curing schedules, the shrinkage and thus the relative dimensions of the flexible mask fabricated may also be controllably varied. In this way, a single die apparatus may be used to fabricate different masks accomodating honeycomb structures experiencing slightly different shrinkages. Again, exact sizing of the mask to the structure is desired but to the extent that that goal cannot be achieved, slight undersizing is preferred to oversizing. Several silicon formulations have been successfully cast using a die apparatus similar to that depicted in FIGS. 7a through 7d formed from machined brass plates incorporating steel, opening forming pins. In each case, the polymer components were mixed, deaired with an approximately 28 inch (71.1 cm.) mercury vacuum for about 20 minutes, applied to the die apparatus and heated for about 8 to 10 minutes at about 240° to 260° Centigrade to accelerate curing. After cooling and removing from the die apparatus, some masks were subjected to an additional post-curing cycle in which each was again heated at approximately 230° to 250° Centigrade for about 16 hours. In each such case, post-curing yielded additional shrinkage. Silicone mixtures which have been successfully cast and their observed linear shrinkage from original die dimensions under the aforesaid oven curing and, where indicated, post-curing schedules are as follows (all % are by volume except where otherwise indicated).

| POLYMER | CURE SHRINKAGE % (APPROX.) | ADDITIONAL POST-CURE SHRINKAGE % (APPROX.) | TOTAL SHRINKAGE % (APPROX.) |
| --- | --- | --- | --- |
| 1. Dow Corning Q3-9595 silicone resin (50% A component mixed with 50% B component) | 3.0–3.3 | 0.5–0.8 | 3.8–4.0 |
| 2. Dow Corning Q3-9590 silicone resin (50% A component mixed with 50% B component) | 2.3–2.6 | 1.4–1.7 | about 4.0 |
| 3. Dow Corning Q3-9595 (50% component A mixed with 50% component B) mixed with additional 10% (by weight) Dow Corning X3-6596A silicone resin (A component only) | 2.8–3.0 | 0.8–1.0 | 3.8–4.0 |
| 4. Dow Corning X3-9592 (50% A component mixed with 50% B component) | 2.5–2.8 | 0.7–1.0 | 3.2–3.5 |
| 5. 50% (by weight) Dow Corning Q3-9595 B component silicone resin mixed with 50% (by weight) Dow Corning X3-6596 A component silicone resin | 2.8–3.0 | about 1.0 | 3.8–4.0 |
| 6. Dow Corning X3-6596 silicone resin (50% A component mixed 50% B component) | 1.9–2.1 | 0.7–0.9 | 2.7–3.0 |
| 7. 25% (by weight) Dow Corning Q3-9590 silicone resin (50% A component mixed with 50% B component) mixed | 2.2–2.4 | 1.0–1.2 | 3.5–3.7 |

| POLYMER | CURE SHRINKAGE % (APPROX.) | ADDITIONAL POST-CURE SHRINKAGE % (APPROX.) | TOTAL SHRINKAGE % (APPROX.) |
| --- | --- | --- | --- |
| with 75% (by weight) Dow Corning X3-6596 silicone resin (50% A component mixed with 50% B component) | | | |
| 8. 25% Dow Corning Q3-9590 silicone resin (50% A component mixed with 50% B component) mixed with 75% Dow Corning X3-6596 silicone resin (50% A component mixed with 50% B component) | 2.5–3.0 | | |
| 9. 90% Dow Corning Q3-9595 silicone resin (50% A component mixed with 50% B component) mixed with 10% Dow Corning X3-6596 A component silicone resin | 2.5–3.0 | | |
| 10. Dow Corning No. 732 silicone resin (50% A component mixed with 50% B component) | 1.8 | | |
| 11. Dow Corning No. 734 silicone resin (50% A component mixed with 50% B component) | 1.8 | | |

Silicone oils have also been added to silicone resins to obtain even greater shrinkages. In each case, the oil was mixed into a mixed silicon resin, de-aired, cast and heated in a mold through the aforesaid curing schedule (230° to 260° Centigrade for 8 to 10 minutes) but was subjected to a post-cure baking at about 230° Centigrade for only about 4 hours. The mixtures examined and their cure, additional post-cure and total shrinkages are as follows (all % are again by volume unless otherwise indicated).

| POLYMER | CURE SHRINKAGE & (APPROX.) | ADDITIONAL POST-CURE SHRINKAGE % (APPROX.) | TOTAL SHRINKAGE % (APPROX.) |
| --- | --- | --- | --- |
| 12. 82.5% (by weight) Dow Corning X3-6596 silicone resin (50% A component mixed with 50% B component) mixed with 17.5% Dow 200 Silicone Oil 20CS | 2.6–2.8 | 1.8–2.0 | 4.4–4.6 |
| 13. 90% (by weight) Dow Corning X3-6596 silicone resin (50% A component mixed with 50% B component) mixed with 10% Dow 200 Silicone Oil 500CS | 2.4–2.7 | 0.6–0.8 | 3.1–3.5 |

Other ratios and curing schedules should yield a range of shrinkages. At least one silicone resin, Dow Corning 184, could not be cast on the aforesaid mold apparently due to interaction with the brass. Adverse reactions may be encountered with other die material and polymer mixes.

Figure 9:
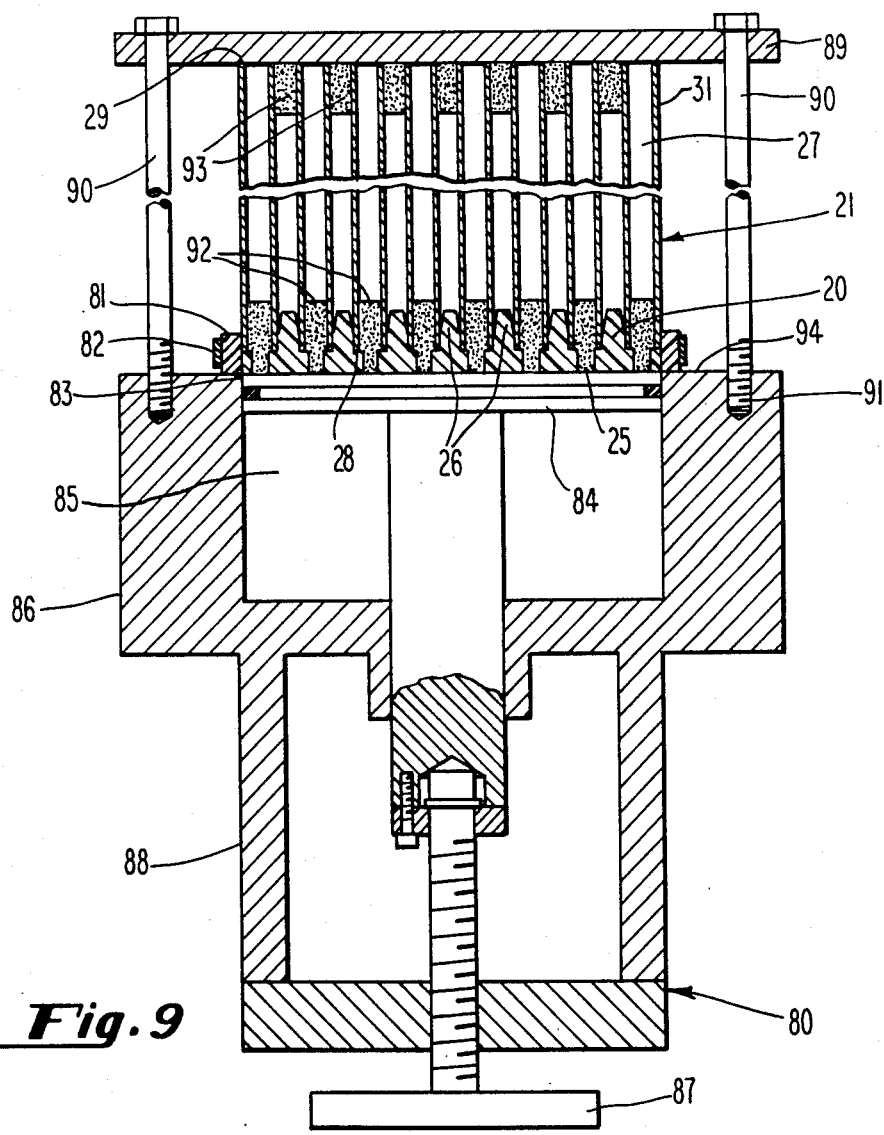
FIG. 9 is a sectioned, schematic view of a press apparatus for charging a plastically formable material such as a plugging cement into a honeycomb structure using the subject flexible mask.

Yet another aspect of the invention are methods and apparatus for manifolding selected cells of a honeycomb structure as would be done during the fabrication of solid particulate filter bodies, using the flexible, elastic masks heretofore described. An exemplary press apparatus 80 is depicted in cross-section in FIG. 9. A flexible mask 20 and honeycomb structure 21 are provided in the manner previously described. The mask 20 has been applied to an end face 28 of the honeycomb structure 21 with its protrusions 26 and openings 25 aligned with the ends of alternate cells 27 at the end face 28. Slight undersizing of the mask 20 will provide mechanical self-locking of it to the structure 21. Moreover, it is suggested that a flexible tubular collar 81 of a suitable material such as neoprene be stretch fitted over the peripheral edges of the mask 20 and outer sidewall 31 of the structure 21 adjoining the end face 28 to assist in holding the mask 20 to the structure 21 and in sealing the structure 21 over an orifice 83 on the upper face 94 of a press head 86. An adjustable, flexible clamp 82 is provided around the collar 81 so as to better secure it to the mask 20 and structure 21. The press apparatus 80 comprises the press head 86 supported by a frame 88. The head 86 is equipped with a piston 84 slidably mounted in a bore 85 for charging a cement mixture through the orifice 83 over which a honeycomb structure 21 is secured. Prior to charging, the piston 84 is backed away sufficiently from face 94 to form a chamber above the piston head which is loaded through the orifice 83 with a suitable amount of a ceramic cement such as the foam-type cements previously referred to. The mask 20 and structure 21 mounting the collar 81 and clamp 82 are then placed over the orifice 83 and held in place by suitable means such as a bar 89 placed across the remaining end face 29 of the structure 21 and held into place by suitable means such as bolts 90 extending through the bar 89 and into suitably threaded bores 91 of the press head 86. The piston 84 is then advanced towards the exit orifice 83 by means of a hand-operated screw 87 or other suitable means and, in the process, presses the cement mass, above the piston 84, against the mask 20 and through its openings 25 into the proximal open ends of the cells 27 juxtaposed to the openings 25, forming cement plugs 92. During this step, the flexible collar 81 also seals the circumferential edge of the orifice 83, preventing the cement from being forced out past the end face 28. Similar plugs 93 have already been formed in the ends of the remaining alternate cells 27 proximal the end face 29 in a previous filling. The structure 21 may then be removed from the press apparatus 80, and the flexible collar 81 and mask 20 may be removed from the structure 21, which is ready for firing to sinter plugs 92 and 93 and structure 21, if appropriate.

A preferred double headed cement press for simultaneously filling both ends of a honeycomb structure using a pair of the subject masks is described in the copending Roy Bonzo application Ser. No. 283,732 now U.S. Pat. No. 4,557,773. Where a pair of masks are used, they may be held in place during handling of the honeycomb structure before its insertion into the press by providing undersized masks or by temporarily securing the masks to the end faces of the honeycomb structure with a mild adhesive which will allow their easy removal after charging.

A preferred method for automatically fitting a subject flexible mask to a honeycomb structure end face is described in a second copending application Ser. No. 283,735, filed July 15, 1981, and now abandoned which is assigned to the assignee of this application and incorporated in its entirety by reference herein. The invention involves centering a mask, such as that depicted in FIGS. 1 through 4, over an end face of a honeycomb structure and preferably constraining its movement to approximately one-half of a cell diameter or less in any lateral direction while inputting a rotational vibrating motion to the structure or the mask. The mask will self-align in one of a limited number of predetermined locations.

Figure 10:
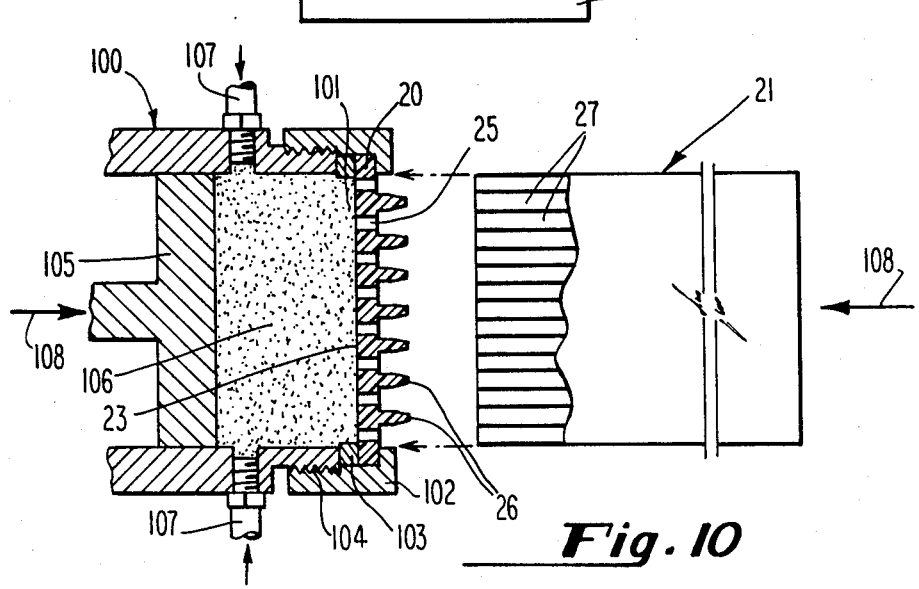
FIG. 10 is a schematic, sectioned view of an envisioned press apparatus having a subject flexible mask incorporated into its exit orifice.

It is further envisioned that the subject mask 20 may be fitted across the feed orifice 101 of a filling device such as a cement press having a press head 100 as depicted schematically in FIG. 10 so as to feed a flowable material, in this embodiment a plastically formable cement, into a honeycomb structure fitted to the filling device's flexible mask 20. The mask 20 is secured to the press head 100 by a suitable collar 102 holding mask 20 against an annular plate 103 or other suitable means. The collar 102 is secured across the feed orifice 101 again by suitable means such as threading 104 or fasteners (not depicted). The structure 21 is brought to the mask and fitted against its exposed protrusions 26. Cement (shading) is fed into a cavity 106 formed in the press head 100 between a piston 105 and the upstream face 23 of the mask 20 through appropriate means such as feed tubes 107. The piston 105 is advanced as indicated by arrow 108 and forces the cement against the mask 20 and through its openings 25 into the open ends of the opposing subset of cells 27. It is further envisioned for fabrication of solid particulate filter bodies and other honeycomb structures manifolded at both their end faces that a second press head similar to the head 100 depicted be provided with an appropriate mask 20 for simultaneous charging of both end faces of the structure.

While the subject invention has been described with particular reference to the manifolding of honeycomb structures in the fabrication of solid particulate filter bodies, it will be appreciated that it may be more generally employed in the loading of the plastically-formable or other flowable substances into selected cells of a honeycomb structure. Moreover, the descriptions and suggested modifications of the various aspects of the invention provided herein are intended to be merely illustrative of rather than limiting the scope of the invention which is set forth more particularly in the following claims.

What is claimed is:

1. A flexible mask for covering an open surface of a honeycomb structure having a multiplicity of hollow cells, including a subset of said cells, extending therein from said open surface and with open ends exposed at said open surface, comprising:
   a solid flexible body having a pair of opposing outer faces, a first one of said outer faces adapted to be applied to said open surface;
   a plurality of openings extending through said body between and through said pair of opposing outer faces, said openings adapted to be aligned opposite the cells of said subset; and
   a plurality of flexible protrusions extending from said first one of the opposing outer faces and adapted for engaging an equal plurality of said open ends of the cells other than the cells of said subset.

2. The mask of claim 1 wherein said body and said protrusions are formed from materials having Durometer Shore A values of approximately 70 or less.

3. The mask of claim 1 wherein said body and said protrusions are also elastic.

4. The mask of claim 1 wherein said body and said protrusions have a Young's Modulus of approximately 10 thousand pounds per square inch or less.

5. The mask of claim 1 further being monolithic.

6. The mask of claim 5 further being formed from an elastic polymer.

7. The mask of claim 6 further being formed from a silicone, or urethane polymer.

8. The mask of claim 1 wherein said protrusions are tapered.

9. The mask of claim 1 wherein said protrusions are arranged in a plurality of substantially mutually parallel rows across said first one of the opposing outer faces.

10. The mask of claim 9 wherein said openings are also arranged in substantially mutually parallel rows which are alternated with said rows of protrusions across said first one of the opposing outer faces.

11. The combination comprising:
    a honeycomb structure having a multiplicity of hollow cells, including a subset of said cells, extending therein from an open surface thereof and with open ends exposed at said open surface; and
    a flexible mask applied to said open surface and comprising a solid flexible body having a pair of opposing outer faces, a first one of said outer faces applied to said open surface, a plurality of openings extending through said body between and through said pair of opposing outer faces, said openings aligned opposite the cells of said subset, and a plurality of flexible protrusions extending from said first one of the opposing outer faces and engaging an equal plurality of said open ends of the cells other than the cells of said subset.

12. The combination of claim 11 wherein said mask is elastic.

13. The combination of claim 12 wherein said mask is stretched across said honeycomb surface.

14. The combination of claim 11 wherein said open ends of said cells have a substantially uniform minimum transverse cross-sectional diameter and said protrusions are tapered from a diameter equal to or greater than said minimum diameter to a diameter less than said minimum diameter.

15. The combination of claim 11 wherein said cells are arranged across said open surface in rows and said openings expose substantially all alternate cells of the multiplicity in a checkered pattern across said open surface.

16. The combination of claim 11 wherein said honeycomb structure is formed from a mixture including ceramic materials.

17. The combination of claim 16 wherein said mask is formed from an elastic polymer.

18. A mask for use in applying a filler material to plug alternate openings in an extruded ceramic monolith element during the fabrication of a particulate filter, the monolith element being of the type having a continuous outer wall internally interconnected by a large number of interlaced thin porous internal walls defining parallel passages extending longitudinally through the ceramic monolith element from opposite end faces thereof with the passages being of substantially uniform cross section and arranged in vertical and horizontal rows when viewed in elevation of a said end face thereof to define a honeycomb matrix; said mask, of flexible elastomeric material, includes a flat base member of a size and shape complementary to a said end face whereby it can be placed in abutment thereagainst, said base member having a plurality of flexible pins extending outward from one face thereof with said pins arranged in a checkerboard configuration, said pins being of a size and shape for insertion into alternate said passages, and having a plurality of apertures extending therethrough with said apertures arranged in a checkerboard configuration but offset relative to said pins, said apertures being of a size and shape whereby a filler material can be extruded therethrough into the associate aligned alternate passages of the monolith element whereby to effect blocking of that end of said passages.

19. A mask for use in the fabrication of a particulate filter, the mask being used to apply a filler material to plug alternate openings in an extruded ceramic monolith element of the type having a continuous outer wall internally interconnected by a large number of interlaced thin porous internal walls defining parallel passages extending longitudinally through the ceramic monolith element from opposite end faces thereof with the passages being of substantially uniform cross section and arranged in vertical and horizontal rows when viewed in elevation of a said end face thereof to define a honeycomb matrix; said mask, of flexible elastomeric material, includes a flat base member of a size and shape complementary to a said end face whereby it can be placed in abutment thereagainst, said base member having a plurality of equally spaced apart flexible pins extending outward from one face thereof with said pins arranged in a checkerboard configuration, said pins being of a size and shape for insertion into said passages, said base having a plurality of equally spaced apertures extending therethrough with said apertures arranged intermediate adjacent said pins, said apertures being of a size and shape whereby a filler material can be extruded therethrough into the associate aligned alternate passages of the monolith element whereby to effect blocking of that end of said passages.

\* \* \* \* \*